US010887655B2

(12) United States Patent
Salomatin et al.

(10) Patent No.: US 10,887,655 B2
(45) Date of Patent: Jan. 5, 2021

(54) CLUSTER-BASED COLLABORATIVE FILTERING

(71) Applicant: Microsoft Technology Licensing, LLC, Redmond, WA (US)

(72) Inventors: Konstantin Salomatin, San Francisco, CA (US); Fares Hedayati, Richmond, CA (US); Jeffrey Douglas Gee, San Francisco, CA (US); Mahesh S. Joshi, Belmont, CA (US); Shivani Rao, Mountain View, CA (US); Gungor Polatkan, San Jose, CA (US); Deepak Kumar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/020,260

(22) Filed: Jun. 27, 2018

(65) Prior Publication Data

US 2020/0007936 A1 Jan. 2, 2020

(51) Int. Cl.
| | |
|---|---|
| *H04N 21/475* | (2011.01) |
| *G06K 9/62* | (2006.01) |
| *H04N 21/482* | (2011.01) |
| *H04N 21/466* | (2011.01) |
| *H04N 21/254* | (2011.01) |
| *H04N 21/25* | (2011.01) |

(Continued)

(52) U.S. Cl.
CPC ....... *H04N 21/4755* (2013.01); *G06K 9/6223* (2013.01); *H04N 21/25* (2013.01); *H04N 21/251* (2013.01); *H04N 21/252* (2013.01); *H04N 21/254* (2013.01); *H04N 21/25435* (2013.01); *H04N 21/25883* (2013.01); *H04N 21/25891* (2013.01); *H04N 21/4668* (2013.01); *H04N 21/47* (2013.01); *H04N 21/4826* (2013.01)

(58) Field of Classification Search
None
See application file for complete search history.

(56) References Cited

U.S. PATENT DOCUMENTS

2006/0095331 A1* 5/2006 O'Malley ............. G06Q 20/20
705/22
2014/0294361 A1* 10/2014 Acharya ............... G11B 27/10
386/241

(Continued)

*Primary Examiner* — Justin E Shepard
(74) *Attorney, Agent, or Firm* — Schwegman Lundberg & Woessner, P.A.

(57) ABSTRACT

The video recommendation system provided with an on-line connection system generates on-line video recommendations using collaborative filtering for clusters of member profiles. The recommendation system clusters member profiles using member profile information as clustering criteria. The video recommendations are then generated for a given cluster, based on aggregation of video viewing history recorded for the member profiles that are in the given cluster, using the video similarity matrix. In order to produce video recommendations for a particular member profile, the recommendation system first determines cluster membership for the member profile, retrieves recommendations generated for that cluster, and provides recommendations to the associated member. A user interface including references to one or more recommended videos is rendered on a display device of a viewer.

20 Claims, 4 Drawing Sheets

(51) Int. Cl.
*H04N 21/47* (2011.01)
*H04N 21/2543* (2011.01)
*H04N 21/258* (2011.01)

(56) References Cited

U.S. PATENT DOCUMENTS

2017/0032257 A1* 2/2017 Sharifi .............. G06F 16/24578
2017/0195731 A1* 7/2017 Girlando ............ H04N 21/4668
2017/0372225 A1* 12/2017 Foresti ................... G06N 20/00

\* cited by examiner

CLUSTER-BASED COLLABORATIVE FILTERING

TECHNICAL FIELD

This application relates to the technical fields of software and/or hardware technology and, in one example embodiment, to system and method to generate on-line video recommendations using collaborative filtering for clusters of member profiles in an on-line connection system.

BACKGROUND

An on-line connection system is a platform for connecting people in virtual space. An on-line connection system may be a web-based platform, such as, e.g., a connection networking web site, and may be accessed by a user via a web browser or via a mobile application provided on a mobile phone, a tablet, etc. An on-line connection system may be a business-focused connection network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a connection networking web site may emphasize employment history and professional skills of the associated member.

An on-line connection system may provide members with on-line access to various videos, including educational videos, such as educational programs or courses. A member can access a video by selecting an item on a designated web page provided by the on-line connection system. A member may also be presented with video recommendations that may appear in the member's news feed, for example.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
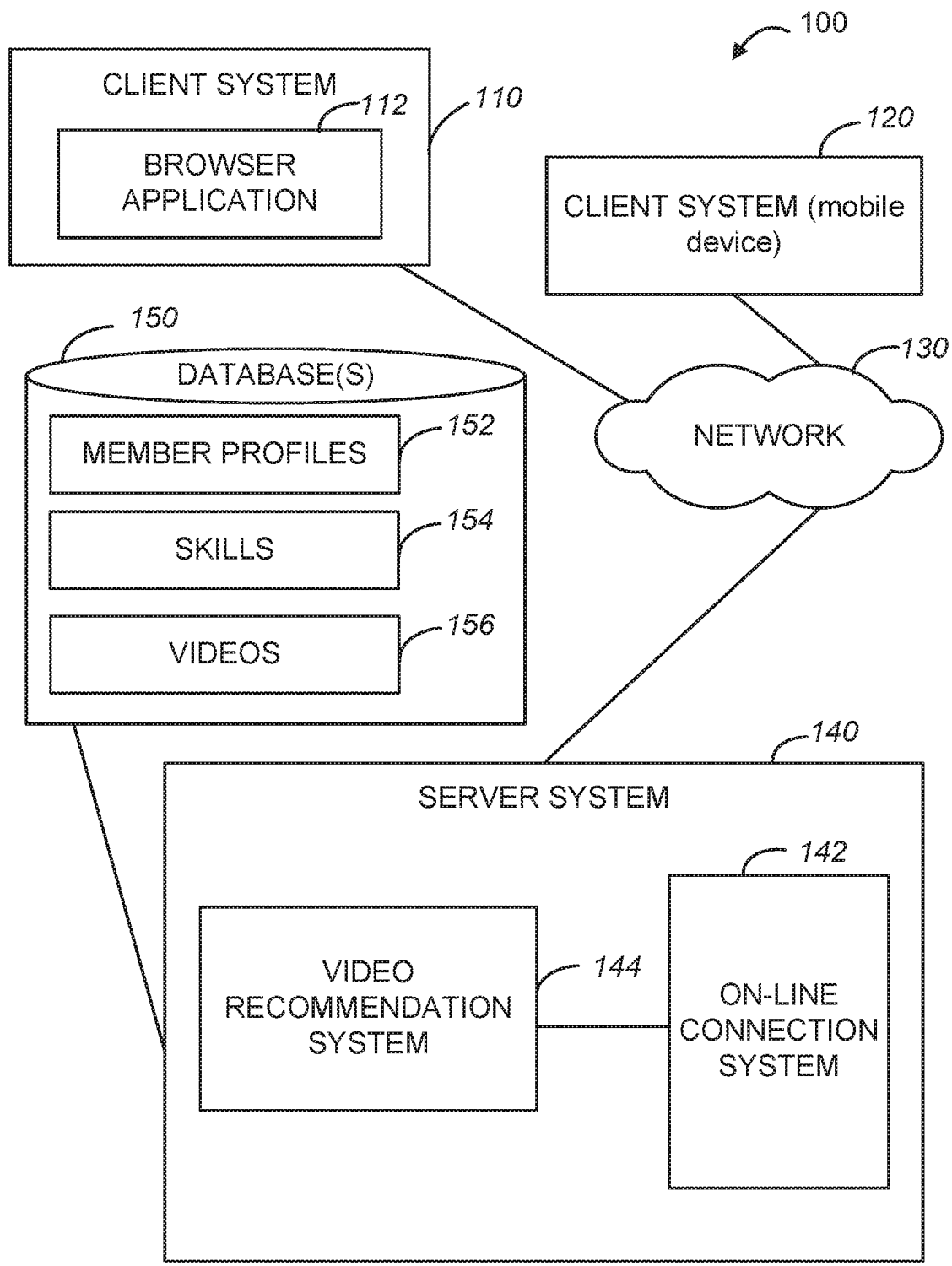
FIG. 1 is a diagrammatic representation of a network environment within which an example method and system to generate on-line video recommendations using collaborative filtering for clusters may be implemented.

A method and system to generate on-line video recommendations using collaborative filtering for clusters of member profiles maintained by an on-line connection system are described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrases "an on-line connection application" and "an on-line connection system" may be referred to as and used interchangeably with the phrase "an on-line connection system" or merely "a connection network." It will also be noted that an on-line connection system may be any type of an on-line connection system, such as, e.g., a professional on-line network, an interest-based on-line network, or any on-line networking system that permits users to join as registered members. Each member of an on-line connection system is represented by a member profile (also referred to as a profile of a member or simply a profile). A member profile may be associated with social links that indicate the member's connection to other members of the connection network. A member profile may also include or be associated with comments or recommendations from other members of the on-line connection system, with links to other network resources, such as, e.g., publications, etc. As mentioned above, an on-line connection system may be designed to allow registered members to establish and document networks of people they know and trust professionally. Any two members of a connection network may indicate their mutual willingness to be "connected" in the context of the connection network, in that they can view each other's profiles, profile recommendations and endorsements for each other and otherwise be in touch via the connection network. Members that are connected in this way to a particular member may be referred to as that particular member's connections or as that particular member's network. The profile information of a connection network member may include various information such as, e.g., the name of a member, current and previous geographic location of a member, current and previous employment information of a member, information related to education of a member, information about professional accomplishments of a member, publications, patents, etc. As mentioned above, the profile information of a connection network member may also include information about the member's professional skills.

As mentioned above, the on-line connection system provides members with access to various videos, e.g., educational videos and may include a video recommendation system that generates video recommendations to members. With respect to a given member profile, the video recommendation system selects videos that have been identified as potentially of interest to the associated member In some embodiments, video recommendations are generated based on historical information indicating which videos the member has already watched and also based on similarity of other videos to those videos already watched. The video recommendation system stores a video similarity matrix, where each pair of videos is given a value indicating similarity between the two videos, and also stores a member watch vector for each member profile, which indicates whether the member represented by the member profile has watched the video or not. In collaborative filtering recommendation systems this matrix is computed based on watch history, where the videos (e.g., courses) that are watched by the same member or similar members are themselves considered as more similar. Video recommendations for a member profile can be generated based on the video similarity matrix and the member watch vector, such that the videos most similar to those already watched are recommended to the associated member.

The recommendation system can be configured to utilize collaborative filtering in the form of leveraging historical information collected with respect to a community of members in the process of generating video recommendations, together with data that is reflected in each member profile, such as skills, professional titles, industry. A skill, for the purposes of this description is an item of information that represents a skill of a member in an on-line connection system and that is stored in a skills database maintained by the on-line connection system. Each skill-related entry in the skills database includes a phrase (e.g., "programming" or "patent prosecution") that can appear in a member profile maintained by the on-line connection system in one or more designated profile sections, such as, e.g., in the skills and endorsements section of a profile. Each pair comprising a given member profile and a given skill (referred to as member-skill pair for the purposes of this description) can be associated with a value indicating whether the member profile includes a reference to the skill. Each pair comprising a given member profile and a given video (referred to as member-video pair for the purposes of this description) can be associated with a value indicating whether the associated member watched the video. The member-skill pairs and the member video pairs can be processed to derive skill-video pairs indicating whether the video have been watched by a member having that skill. The value associated with a skill-video pair can reflect the number of members having the skill that watched the video. The skill-video pairs can be used to generate, for each skill, a vector that indicates whether and how many members having that skill watched each of the videos provided by the on-line connection system and use this vector together with the video similarity matrix (where each pair of videos is given a value indicating similarity between the two videos) to generate skill-based video recommendations, where a given skill is stored as associated with one or more recommended videos. In operation, the recommendation system accesses a subject member profile and, for each skill present in the subject profile retrieves video recommendations.

In a manner similar to generating skill-based video recommendations, the recommendation system can be configured to generate title-based recommendations (using information about members that list certain professional titles in their profiles having watched certain videos) and also to generate industry-based recommendations (using information about members that list particular industries in their profiles having watched certain videos). The recommendation system may then generate video recommendations with respect to a given member profile based on the title or industry reflected in the subject profile.

The technical problem of improving quality of video recommendations generated by a machine with respect to a profile representing a member in an on-line connection system is addressed by the methodologies described herein that leverage observed characteristics of many users to infer preferences of an individual. Specifically, the recommendation system clusters member profiles using member profile information as clustering criteria. The video recommendations are then generated for a given cluster, based on aggregation of video viewing history recorded for the member profiles that are in the given cluster, using the video similarity matrix. Examples of such aggregation include summation and averaging of vectors representing viewing history of cluster members. In order to produce video recommendations for a particular member profile, the recommendation system first determines cluster membership for the member profile, retrieves recommendations generated for that cluster, and provides recommendations to the associated member. This approach can be used beneficially to identify valuable video recommendations for those member profiles that do not have an expansive video viewing history.

As explained above, a member profile maintained by the on-line connection system stores, in one or more designated sections of the profile, data representing professional skills corresponding to respective entries in the skills database. In some embodiments, the recommendations system uses skills as clustering criteria. Other profile categories, such as title or industry, can be also used, alone or in combination, as clustering criteria. Clustering criteria may also be based on a member's current status with respect to the on-line connection system, where the recommendation system generates respective member activity vectors that include dimensions related to a member's interactions with the on-line connection system, such as, e. g., job searches, frequency of login sessions, click trough rates and view through rates with respect to various types of content, etc. Recommendations generated for clusters constructed based on member activity vectors are referred to as activity-based video recommendations. An example video recommendation system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line connection system 142. As explained above, each member of an on-line connection system is represented by a member profile that contains personal and professional information about the member and that may be associated with social links that indicate the member's connection to other member profiles in the on-line connection system. Member profiles and related information may be stored in a database 150 as member profiles 152. The database 150 also stores skills 154.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a video recommendation system 144. The video recommendation system 144 is configured to generate on-line video recommendations using collaborative filtering for clusters of member profiles, applying methodologies discussed herein. Electronic videos may be provided by the on-line connection system and stored as videos 156 in the database 150. An example video recommendation system 144 is illustrated in FIG. 2.

Figure 2:
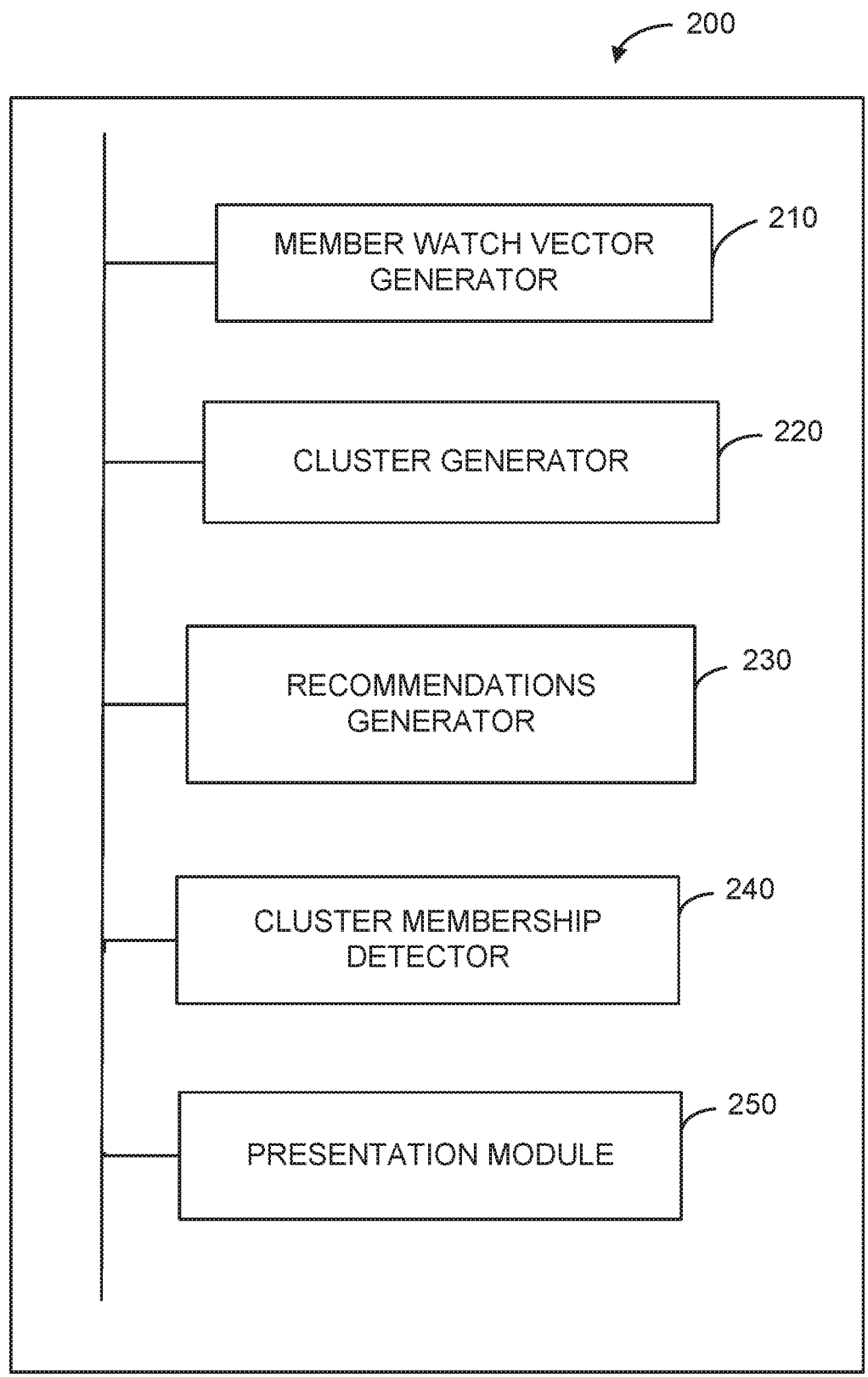
FIG. 2 is block diagram of a system to generate on-line video recommendations using collaborative filtering for clusters, in accordance with one example embodiment.

FIG. 2 is a block diagram of a system 200 to generate on-line video recommendations using collaborative filtering for clusters. As shown in FIG. 2, the system 200 includes a member watch vector generator 210, a cluster generator 220, a recommendations generator 230, a cluster membership detector 240, and a presentation module 250. The member watch vector generator 210 is configured to generate respective member watch vectors. As explained above, a member watch vector generated for a particular member profile has dimensions that represent electronic videos available in the on-line connection system 142 of FIG. 1 and values indicating interaction originated with that member profile with respect to an electronic video represented by a respective dimension. The cluster generator 220 is configured to generate member profile clusters, e.g., using k-means clustering technique, based on data associated with the member profiles. Examples of criteria data used for clustering include skills data provided in a designated section of the member profiles, title information, industry information, and current status of a member profile with respect to the on-line connection system. The current status of a member profile with respect to the on-line connection system may be represented by an activity vector with dimensions representing types of activities and values reflecting engagement of a member profile with the respective types of activities. As stated above, examples of different types of activities include job searches, login sessions, etc.

The recommendations generator 230 is configured to generate video recommendations with respect to a given cluster of member profiles using member watch vectors generated for profiles in that cluster, together with a video similarity matrix. As explained above, the video similarity matrix stores data reflecting similarity between the electronic videos available in the on-line connection system (e.g., as videos 156 of FIG. 1).

The cluster membership detector 240 is configured to identify a subject member profile as being from a given cluster, based on criteria data associated with the subject member profile and to retrieve the set of video recommendations generated by the recommendations generator 230 for that given cluster.

The presentation module 250 is configured to cause presentation of a reference to a video from rom the set of video recommendations on a display device. In some embodiments, the presentation module 250 generates additional user interface including the presentation of references to electronic videos corresponding to items in the presentation set of videos, where the additional user interface comprises a control associated with an item from the presentation set of videos actionable to activate a preview of an electronic video corresponding to the reference. For example, the presentation module 250 may generate a user interface (UI) by including the reference to the video from the set of video recommendations. The UI is then communicated a client computer associated with a login session for the subject member profile with respect to the on-line connection system. The UI may also include a news feed generated with respect to the subject member profile, or it may be provided on a designated profile page for the subject member profile. Some operations performed by the system 200 may be described with reference to FIG. 3.

Figure 3:
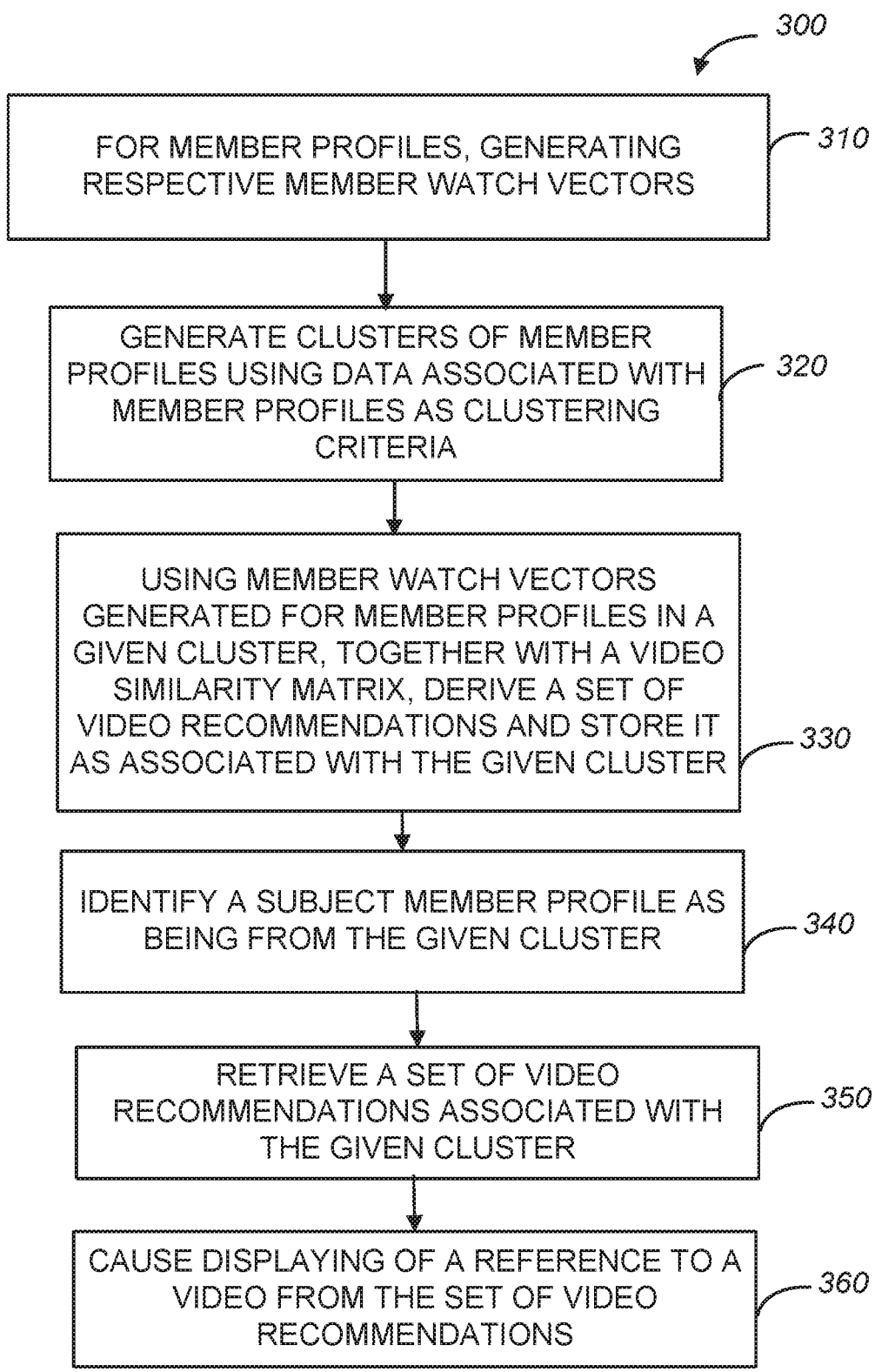
FIG. 3 is a flowchart illustrating a method to generate on-line video recommendations using collaborative filtering for clusters, in accordance with an example embodiment.

FIG. 3 is a flowchart of a method 300 to generate on-line video recommendations using collaborative filtering for clusters 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the member watch vector generator 210 of FIG. 2 generates respective member watch vectors. At operation 320, the cluster generator 220 of FIG. 2 generates member profile clusters. At operation 330, the recommendations generator 230 of FIG. 2 generates video recommendations with respect to a given cluster of member profiles using member watch vectors generated for profiles in that cluster, together with a video similarity matrix. The cluster membership detector 240 of FIG. 2, t operation 340, identifies a subject member profile as being from the given cluster, based on criteria data associated with the subject member profile, and retrieves the set of video recommendations generated by the recommendations generator 230 for that given cluster, at operation 350. The presentation module 250 of FIG. 2 causes presentation of a reference to a video from rom the set of video recommendations on a display device, at operation 360.

Figure 4:
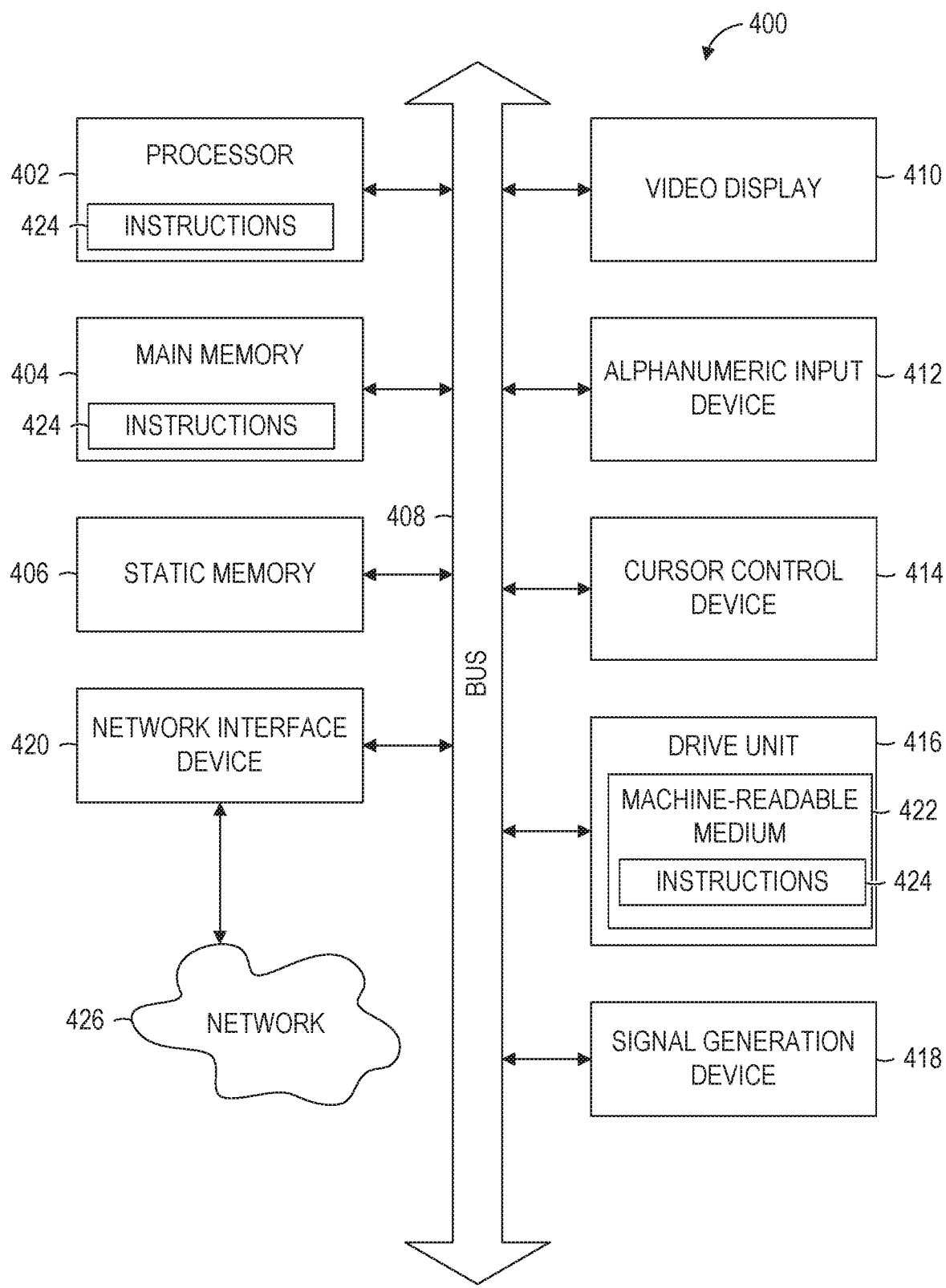
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to generate on-line video recommendations using collaborative filtering for clusters has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
maintaining user profiles representing users in an on-line connection system;
for the user profiles, generating respective user watch vectors having dimensions that represent electronic videos available in the on-line connection system and values indicating interaction originated with the user profile with respect to an electronic video represented by a respective dimension;
generating user profile clusters based on criteria data associated with the user profiles;
for each cluster from the user profile clusters, generating a respective aggregation of video viewing history recorded for user profiles in the given cluster based on user watch vectors generated for user profiles in the given cluster, the respective aggregation of video viewing history recorded for user profiles in the given cluster representing the given cluster;
using the respective aggregation of video viewing history recorded for user profiles in the given cluster, together with a video similarity matrix storing data reflecting similarity between the electronic videos available in the on-line connection system, deriving a set of video recommendations and storing the set of video recommendations as associated with the given cluster, using one or more processors;
identifying a subject user profile as being from the given cluster, based on criteria data associated with the subject user profile;
retrieving the previously stored set of video recommendations associated with the given cluster; and
causing displaying of a reference to a video from the set of video recommendations on a display device.

2. The method of claim 1, comprising generating a user interface (UI) by including the reference to the video from the set of video recommendations and communicating the generated UI to a client computer associated with a login session for the subject user profile.

3. The method of claim 2, wherein the UI also includes a news feed generated with respect to the subject user profile.

4. The method of claim 2, wherein the UI is provided on a designated profile page for the subject user profile.

5. The method of claim 1, wherein the criteria data is skills data provided in a designated section of the user profiles.

6. The method of claim 1, wherein the criteria data is current status of a user profile with respect to the on-line connection system.

7. The method of claim 6, comprising generating, for the subject user profile, an activity vector with dimensions representing types of activities and values reflecting engagement of a user profile with the respective types of activities.

8. The method of claim 7, wherein an activity from the types of activity is a job search.

9. The method of claim 1, comprising generating user profile clusters using k-means clustering.

10. The method of claim 1, comprising generating the video similarity matrix based on content and metadata of electronic videos provided by the on-line social system.

11. A system comprising:
one or more processors; and
a non-transitory computer readable storage medium comprising instructions that when executed by the one or more processors cause the one or more processors to perform operations comprising:
maintaining user profiles representing users in an on-line connection system;
for the user profiles, generating respective user watch vectors having dimensions that represent electronic videos available in the on-line connection system and values indicating interaction originated with the user profile with respect to an electronic video represented by a respective dimension;
generating user profile clusters based on criteria data associated with the user profiles;
for each cluster from the user profile clusters, generating a respective aggregation of video viewing history recorded for user profiles in the given cluster based on user watch vectors generated for user profiles in the given cluster, the respective aggregation of video viewing history recorded for user profiles in the given cluster representing the given cluster;
using the respective aggregation of video viewing history recorded for user profiles in the given cluster, together with a video similarity matrix storing data reflecting similarity between the electronic videos available in the on-line connection system, deriving a set of video recommendations and storing the set of video recommendations as associated with the given cluster, using one or more processors;
identifying a subject user profile as being from the given cluster, based on criteria data associated with the subject user profile;
retrieving the previously stored set of video recommendations associated with the given cluster; and
causing displaying of a reference to a video from the set of video recommendations on a display device.

12. The system of claim 11, comprising a user interface (UI) that includes the reference to the video from the set of video recommendations, wherein the one or more processors to perform operations comprising communicating the generated UI to a client computer associated with a login session for the subject user profile.

13. The system of claim 12, wherein the UI also includes a news feed generated with respect to the subject user profile.

14. The system of claim 12, wherein the UI is provided on a designated profile page for the subject user profile.

15. The system of claim 11, wherein the criteria data is skills data provided in a designated section of the user profiles.

16. The system of claim 11, wherein the criteria data is current status of a user profile with respect to the on-line connection system.

17. The system of claim 16, wherein the one or more processors to perform operations comprising generating, for the subject user profile, an activity vector with dimensions representing types of activities and values reflecting engagement of a user profile with the respective types of activities.

18. The system of claim 17, wherein an activity from the types of activity is a job search.

19. The system of claim 11, wherein the one or more processors to perform operations comprising generating user profile clusters using k-means clustering.

20. A machine-readable non-transitory storage medium having instruction data executable by a machine to cause the machine to perform operations comprising:
- maintaining user profiles representing users in an on-line connection system;
- for the user profiles, generating respective user watch vectors having dimensions that represent electronic videos available in the on-line connection system and values indicating interaction originated with the user profile with respect to an electronic video represented by a respective dimension;
- generating user profile clusters based on data in the user profiles;
- for each cluster from the user profile clusters, generating a respective aggregation of video viewing history recorded for user profiles in the given cluster based on user watch vectors generated for user profiles in the given cluster, the respective aggregation of video viewing history recorded for user profiles in the given cluster representing the given cluster;
- using the respective aggregation of video viewing history recorded for user profiles in the given cluster, together with a video similarity matrix storing data reflecting similarity between the electronic videos available in the on-line connection system, deriving a set of video recommendations and storing the set of video recommendations as associated with the given cluster;
- identifying a subject user profile as being from the given cluster, based on criteria data associated with the subject user profile;
- retrieving the previously stored set of video recommendations associated with the given cluster; and
- causing displaying of a reference to a video from the set of video recommendations on a display device.

* * * * *